United States Patent Office 3,099,785
Patented July 30, 1963

3,099,785
MEANS FOR CONTROLLING VALVE-ACTION RECTIFIERS
Claus Kessler and Gottfried Möltgen, Erlangen, Germany, assignors to Siemens-Schuckertwerke Aktiengesellschaft, Berlin, Germany, a corporation of Germany
Filed Nov. 3, 1959, Ser. No. 850,633
Claims priority, application Germany Nov. 4, 1958
6 Claims. (Cl. 321—18)

Our invention relates to methods and means for operating controllable valve-action rectifiers such as grid controlled current-rectifier tubes.

As a rule, the voltage of such rectifiers is controlled or regulated by phase control, also called delayed-commutation control, which causes the ignition or "firing" moment of each individual anode to be delayed a phase angle $\alpha$ of greater or smaller magnitude relative to the moment at which the ascending voltage wave of that anode and the descending voltage wave of a phase-adjacent anode have equal instantaneous amplitudes. The degree of control is varied by continuously shifting the ignition moments between the limit of full control ($\alpha=0$) and the limit of highest permissible D.-C. to A.-C. inverter action ($\alpha_{max}$), the latter limit being determined by the safe minimum spacing from the phase position $\alpha=180°$. Normally, $\alpha_{max}$ is about 150° at full rated load and may be shifted closer to 180° at partial load. For improving the power factor of large operating units comprising a multitude of anodes, an asymmetric control has often been used according to which, instead of simultaneously and uniformly controlling the ignition moments of all anodes, only individual groups or individual anodes or tubes are successively controlled down to complete cut-off. In such cases, too, the ignition moment of each individual anode is shifted continuously through all intermediate phase positions between the two limits. This requires rather complicated control devices operating with control voltages of respectively different wave shapes, some of them difficult to produce, particularly if the current rectifier serves to energize a speed-controllable electric drive.

It is an object of our invention to afford a satisfactory control of grid-controlled and other controllable valve-action rectifiers while reducing the reactive-power demand and hence improving the power factor of such rectifiers.

Another object is to provide a rectifier control that permits reducing the arc-back tendencies of phase-controlled valve-action rectifiers thus making them less susceptible to damage due to overloads than the known phase controlled systems.

Still another object of our invention is to afford a satisfactory phase control of valve-action rectifiers by means of a simplified control system.

In a preferred object of our invention, it is also an object to devise a valve-action rectifier system in which the advantages according to the above-stated objects are utilized for the operation of speed-controllable motors.

In accordance with a feature of our invention, the phase control of a valve-action rectifier is limited to two selected ignition angle values, one being located in the cycle range of rectifying operation and the other in the range of inverter operation. We further provide a virtually inertia-free electronic regulator for abruptly changing the phase position of the ignition moment from one to the other phase-angle value or vice versa, with each directional change of the voltage departure from the regulated datum value.

As a rule, this method of control is simpler than the methods heretofore customary and, analogously, the necessary control devices are likewise simplified. Furthermore, the reactive-power requirement of the current rectifier can be kept considerably lower over its entire control range. Another advantage of the novel control method is the fact that in the event of switching at a high pulse frequency, the components of the upper harmonics spectrum corresponding to the pulse frequency have the same phase positions. Other frequency components, foreign to the fundamental pulse frequency, appear only with slight effective values. The slightest reactive power requirement and hence the best power factor under otherwise equal conditions can be achieved by selecting the two ignition-angle values so that they are identical with the respective extreme values of full rated control under rectifying operation ($\alpha=0$) and highest permissible inverter control operation ($\alpha=\alpha_{max}$). By controlling the safety spacing $180°-\alpha_{max}$ in dependence upon the rectifier load current, an optimal utilization of the inverter range is afforded.

The control system used for performing the method according to the invention may be designed on the pulse principle according to which for each anode, in each alternating-voltage wave period, two pulses of respectively fixed phase positions are kept available, for example, a pulse at $\alpha=0°$ and a pulse at $\alpha=150°$. One of these ignition pulses at a time is suppressed by the regulator depending upon whether at the particular moment the actual value of the regulated quantity, i.e. the instantaneous mean value of rectifier output voltage or current, is smaller or greater than the predetermined datum value. As long as the actual value is below the datum value, while the load is being supplied with rectified current, the ignition pulse for each anode becomes effective at the moment $\alpha=0$. In this case it is not necessary to suppress the other pulse located at $\alpha=150°$, because the latter pulse can anyhow occur at a moment when it cannot effect any change in the existing operating condition of the valve-action rectifier. However, if the measured value exceeds the datum value, the regulator suppresses the first pulse at $\alpha=0°$ so that only the second pulse becomes effective at the moment $\alpha=150°$ and then initiates a conducting interval of the anode in which the particular valve-action device operates as an inverter. This causes the mean value of the measured magnitude on the direct-current side to be reduced toward the datum value.

The above-described type of operation corresponds, for example, to the starting of a direct-current drive motor, the increase of its speed, and the motor operation under load. The operation under braking conditions and reversal in running direction can be derived therefrom with the aid of conventional methods and circuitry and can be brought about by correspondingly changing the datum value of the controlling magnitude.

The invention will be further explained with reference to the drawings in which.

Figure 1:
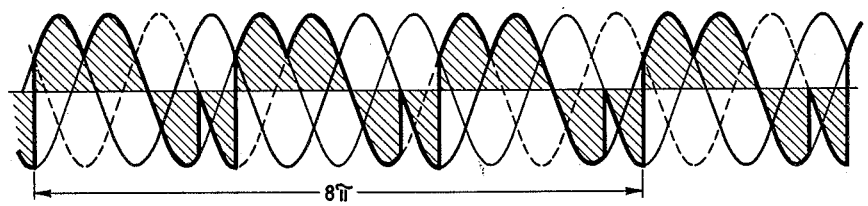
FIGS. 1 to 3 illustrate voltage-time diagrams explanatory of the novel control method.
Figure 2:
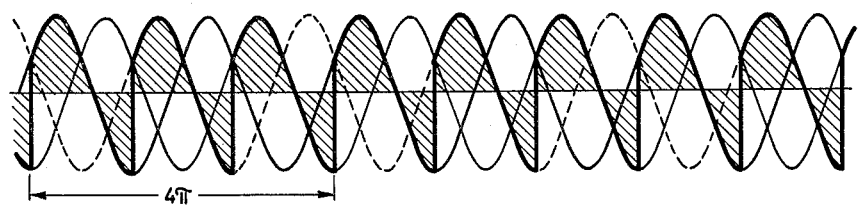
Figure 3:
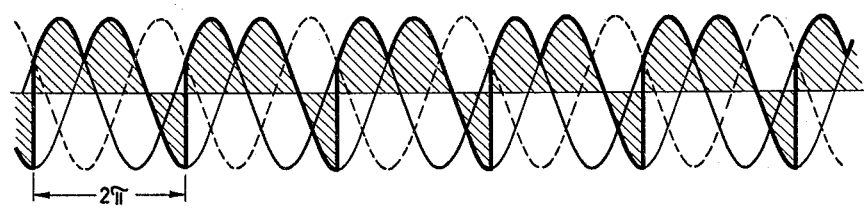

The voltage-time graphs in FIGS. 1, 2 and 3 represent the formation of the rectified voltage in a three-phase system operating with phase control according to the invention, the two predetermined ignition pulses being set to occur at the phase positions $\alpha=0°$ and $\alpha=150°$. The three graphs apply to three respective special cases of operation corresponding to different ratios of the actual value of direct voltage $U_g$ to the direct-voltage mean value $U_{go}$ attained at full rated control $\alpha=0°$. FIG. 1 applies to $U_g:U_{go}=0.158$, a single cycle of an ignition sequence comprising four full-wave periods=$8\pi$. FIG. 2 applies to $U_g:U_{go}=0.25$, a complete cyclical ignition sequence comprising two half-wave periods=$4\pi$. FIG. 3 applies to $U_g:U_{go}=0.5$. An ignition-sequence cycle in the latter case comprises a single half-wave period=$2\pi$, one of the three phases being not active in this case.

In practice, the stationary conditions represented in FIGS. 1, 2, 3 will hardly occur because the slightest fluctuation in feeder voltage or load will produce irregularities. Consequently, each direct-voltage value comes about by a statistic mean-value formation on the basis of the most probable ignition sequence. A current rectifier thus controlled has nearly the same slight reactive-power consumption over the entire voltage range inclusive of inverter operation, as obtains at full rated control under consideration of the reactive power required by the commutation as such. Furthermore, the duty imposed upon the valve-action rectifier, determined by the product of abrupt voltage change and current steepness, is considerably smaller than with the continuous shifting of the ignition angle occurring in conventional phase control.

With respect to smoothing of the rectified current, the novel control method is no more demanding than those heretofore customary. For example, the time constant in the direct-current circuit of a three-pulse current rectifier is preferably set to a value in the order of 0.1 second, which is readily obtainable with the conventional smoothing means. Although upper harmonics of all imaginable order numbers may occur in the alternating feeder current, the majority of these is limited to various small amplitudes and is statistically distributed over the duration of operation. Hence these upper harmonics do not have a disturbing effect. The "fundamental spectrum" correlated to the pulse number remains substantially invariable over the entire control range, and has a definite phase position to the fundamental wave. This is significant for current rectifier devices of relatively high pulse frequency whose individual systems or commutation groups operate with the same load. Consequently the conditions relative to the upper harmonics appertaining to the "fundamental spectrum" are more favorable than with current rectifier devices operated by the conventional control method of continuous phase shift.

Since the operation in accordance with the control method of our invention requires a virtually inertia-free change between the two predetermined ignition positions, the control and regulating devices are preferably equipped with electronic tubes, transistors or other controllable electronic semiconductor devices. In principle, the devices generally known for such purposes are applicable, except that the otherwise necessary means for displacing the phase position of the ignition moments can be dispensed with. For example, suitable devices for producing ignition pulses by means of transistors are known as such. For determining the switching signals which cause either one or the other control pulse to become effective in dependence upon the direction of the departure of the measured magnitude from the datum value, a bi-stable regulator, particularly a transistor regulator, may be used.

Figure 4:
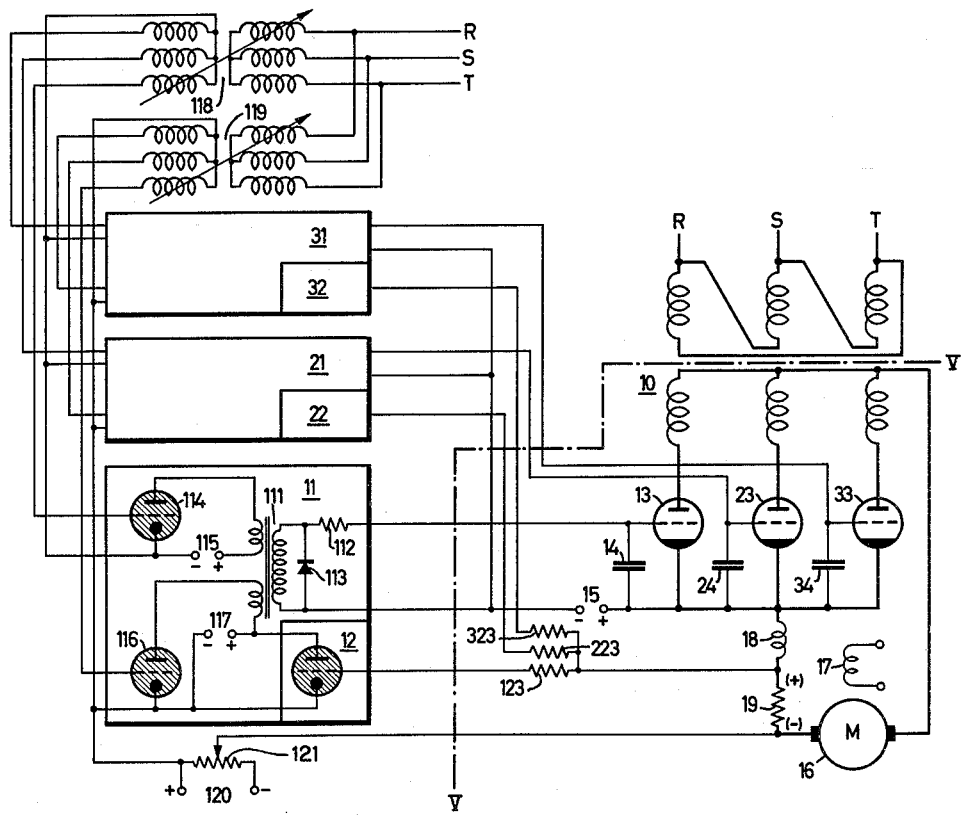
FIG. 4 is a circuit diagram of a motor control system according to the invention.

The circuit diagram shown in FIG. 4 exemplifies a direct-current motor control system embodying the above-described regulating method according to the invention.

The rotor 16 of a direct-current motor M is energized from a three-phase alternating current line R, S, T through a transformer 10 and a grid-controlled current rectifier which, in the illustrated example, comprises in each of its three phases a single-anode gaseous discharge tube 13, 23 or 33. A capacitor 14, 24 or 34 is connected between the control grid and the pool cathods of the tube. The primary winding of power transformer 10 is delta-connected. The secondary windings are wye connected. The direct-current load circuit of the commutation group of rectifier tubes includes the rotors 16 of motor M whose field winding 17 is excited, for speed control, from a separate source of adjustable direct voltage. The direct current load circuit further includes a smoothing reactor 18 and a series resistor 19 for providing a voltage drop (IR-drop) indicative of the value of current flowing through the rotor.

In the particular motor control system illustrated, the IR-drop voltage across resistor 19 is used as a (measuring) pilot magnitude for maintaining constant rotor current at any value of excitation applied to the field winding 17. It will be understood, however, that the IR-drop resistor 19 is illustrated only as an example of a suitable means for sensing the actual current magnitude and may be substituted by any other device capable of providing a pilot voltage indicative of the current, such as a magnetic direct-current transformer or a direct-current transforming device of the Hall-voltage generating type. Analogously, the pilot magnitude for regulating the operation of the motor or other load may be representative of any other operating characteristic such as motor speed, armature voltage, or a plurality of such pilot magnitudes.

The control device of the rectifier comprises three control units 11, 21 and 31. Since they have all the same design and performance, only the unit 11 is illustrated in detail and described below.

The control unit 11 comprises two thyratrons 114 and 116 whose respective plate voltages are supplied from direct-voltage sources 115 and 117. Two primary windings of a pulse transformer 111 are connected in the respective plate circuits. The control grids of tubes 114 and 116 are connected to the same alternating current line RST from which the power rectifier tubes 13, 23, 33 are energized through transformer 10. The tubes 114 and 116 operate as switches for generating the firing pulses to be impressed upon the control grid of the rectifier tube 13. The phase angle of the firing pulses can be adjusted by varying the phase position of the grid voltage with the aid of a variable transformer 118 or 119. For example, the switching tube 114 may issue positive pulses at the firing angle $\alpha=0$ for full rated control of the power rectifier, whereas the switching tube 114 may be set by means of the variable transformer 118 to issue firing pulses for inverter operation of the power rectifiers, for example at a phase position corresponding to the phase angle $\alpha=150°$. These firing pulses are transmitted by the pulse transformer 111 through a grid-circuit resistor 112 upon the control grid of rectifier tube 113. A rectifier diode 113, preferably of the solid-state type, is connected parallel to the secondary winding of the pulse transformer 111 for suppressing the negative half-waves of the pulses.

The inertia-free electronic regulating device for the motor 16 comprises another thyratron or other switching tube connected in parallel to the direct-current voltage source 117. The grid-cathode control circuit of tube 12 is connected across the above-mentioned resistor 19 in series-opposed relation to an adjusted constant direct voltage tapped off a potentiometer rheostat 121 which is energized at 120 from a source of constant direct voltage. A resistor 123 is connected in series with the control grid of tube 12, the corresponding resistors for control units 21, 31 being denoted by 223, 323 respectively.

The control circuit operates by comparing the variable pilot voltage from resistor 19 with the adjusted constant datum or pattern voltage adjusted at rheostat 121, so that the potential impressed upon the control grid of regulator tube 12 depends, as to polarity and magnitude, upon the direction and magnitude of the error voltage defined by the departure of the condition-responsive pilot voltage from the adjusted constant datum value.

If the departure is positive, that is, if the actual value of motor current is larger than the datum value, the switching tube 12 is conducting, the plate voltage source 117 for switching tube 116 is shorted by tube 12, and the issuance of firing pulses having the phase angle $\alpha = 0$ for full-rated rectifying operation is prevented so that only the inverter pulses of the switching tube 114 can reach the rectifier tube 13 at the phase moment corresponding to the angle $\alpha = 150°$. Due to this switching from one to the other phase angle position, and the resulting operation of the power rectifier as a direct-current to alternating-current inverter, the direct current in the load circuit will drop accordingly until the proper operating conditions are re-established.

If the regulating departure is negative, the switching tube 12 remains inactive, and the rectifier tube 13 is ignited by the firing pulses of the switching tube 116 at the phase angle $\alpha = 0$. Consequently, the direct current in the load circuit of the rectifier system increases for re-establishing or maintaining the desired current value. In the latter case the inverter pulses of switching tube 114 may pass upon the control grid of rectifier tube 13 at the subsequent moment corresponding to $\alpha = 150°$, at which moment the arc in rectifier tube 13 is already burning so that the latter pulses remain ineffective.

The control method according to the invention is also applicable for controllable semiconductor valve-action devices which likewise permit a delayed-commutation control by means of pulses that are delayed relative to the voltage zero passage, and in which a cut-off or blocking action of the semiconductor device can take place only at the next following current zero passage. Among such semiconductor devices, operating in analogy to thyratrons or ignitions are the four-zone semiconductor systems of the p-n-p-n or n-p-n-p type, also called controllable semiconductor rectifiers, in which the intermediate p-n junction prevents the flow of current in each cycle period of an alternating voltage impressed across the outermost electrodes, until the p-n junction is made permeable to current by an electric or light pulse and thus "ignites" the semiconductor rectifier.

Figure 5:
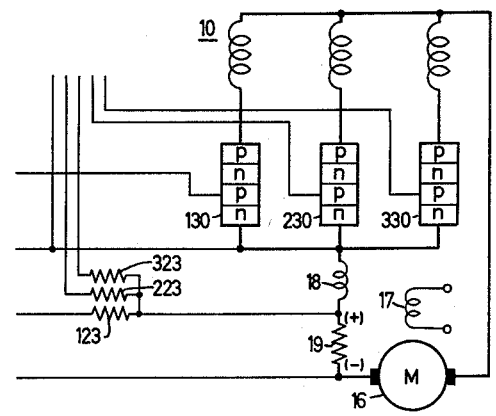
FIG. 5 shows part of the same circuit diagram in modified form, both diagrams being presented for the purpose of exemplification.

Thus, in the modified rectifier system according to FIG. 5, the individual rectifier members in the three phases of the commutating group consist of controlled silicon rectifiers of p-n-p-n type which operate as high-power bistable switching devices. The control system differs from that of FIG. 4 in that the grid-cathode capacitors 14, 24 and 34 as well as the source 15 of cut-off potential are omitted. This can be done because the capacitors 14, 24 and 34 in FIG. 4 serve for minimizing variations in grid potential during the abrupt changes in anode voltage and, like the auxiliary source 15, are usually employed in conjunction with gaseous discharge devices.

FIG. 5 shows only the system portion at the right of the line V—V in FIG. 4, the left-hand portion of the system being identical with the one shown in FIG. 4. The performance of the system is in accordance with the one described above.

In rectifier systems according to the invention, the arc-back stresses imposed upon the valve-action component over the entire control range are only negligibly greater than with full-rated control ($\alpha = 0$ or $\alpha = 180°$). This is because, aside from $\alpha = 0$ and $\alpha = \alpha_{max}$, the latter value departing only slightly from 180°, no other firing-angle values can occur during operation. For that reason, the rectifier units, in the event of overload impacts, can withstand greater amounts of current without damage than is the case with the conventional control operation involving a continuous variation of the firing angle $\alpha$.

It will be obvious to those skilled in the art upon a study of this disclosure that our invention permits of various modifications with respect to circuitry and components and may be used for purposes other than controlling and electric drive motor, without departing from the essential features of our invention and within the scope of the claims annexed hereto.

We claim:

1. A rectifier system, comprising an alternating-current feeder circuit, a direct-current load circuit, valve-action rectifier means connecting said feeder circuit with said load circuit and having firing control means for initiating rectifier firing at a point relative to the voltage cycle of the alternating feeder current, first firing-pulse means connected with said feeder circuit to be synchronized therewith for issuing pulses during rectifying operation of said rectifying means, second firing-pulse means connected with said feeder circuit to be synchronized therewith for issuing pulses during inverting operations of said rectifying means, said two firing-pulse means having pulse output leads connected to said firing control means, whereby said two firing-pulse means abruptly switch the firing point between two phase positions in the rectifier cycle ranges, condition-responsive and substantially inertia-free electronic switching means connected to one of said firing-pulse means and responsive to directional reversal of a given operating condition of said load circuit for turning it on and off to thereby regulate said operating condition.

2. A rectifier system, comprising alternating-current multiphase feeder means, a direct-current load circuit, gaseous rectifier tube means having anode-cathode circuits connecting the respective phases of said feeder means with said load circuit and having respective control electrodes for shifting the firing time point of each anode relative to the voltage cycle of the alternating current, two pulse generating means each having respective pulse trigger circuits connected to said feeder means for timed pulse release once during each cycle and having respective pulse circuits connected to said control electrodes, said trigger circuits having respectively different timing so that the respective pulses of said two pulse generating means have phase positions in the rectifier cycle-ranges of rectifying and inverting operations respectively, condition-responsive and substantially inertia-free electronic switching means connected to said firing-pulse means and responsive to directional reversal of a given operating condition of said load circuit to abruptly extinguish one of the pulse generating means to thereby regulate said operating condition.

3. In a rectifier system according to claim 1 said valve-action rectifier means consisting of bistable solid-state semiconductor switching members.

4. In a rectifier system according to claim 1, said valve-action rectifier consisting of controllable bistable four-zone junction rectifier members.

5. A system for rectifying the current flow from a source of feeder voltage to a load comprising, valve-action rectifier means for connecting said feeder source to said load, said rectifier means having firing control means for initiating firing of said rectifier means at a point relative to the voltage cycle of the source voltage, pulse generator means connected to said firing control means and adapted to be connected to said source for repeatedly issuing pulses first during the rectifying operation and then during the inverting operation of the rectifier means at phase positions synchronized by said source, whereby said rectifier means are abruptly fired during each type of operation, and switching means adapted to respond to the output voltage at the load and connected to said pulse generator means for extinguishing predetermined ones of said pulses from said pulse generator means in response to the output voltage, whereby the output voltage is regulated.

6. A system for rectifying the current flow from an alternating current source to a load comprising, valve-action rectifier means for connecting the circuit to the load, said rectifier means having pulse-responsive firing control means for initiating firing at said rectifier means, source-responsive pulsing means for applying to said control means pulses at predetermined intervals within the rectifying as well as inverting ranges of said rectifier means so as to initiate firing at only preselected phase positions relative to the source, and load voltage-responsive means and connected to said pulsing means for eliminating some of said pulses from said pulsing means according to the load voltage.

References Cited in the file of this patent
UNITED STATES PATENTS

| | | |
|---|---|---|
| 2,136,227 | Augier et al. | Nov. 7, 1938 |
| 2,492,007 | Raymond | Dec. 20, 1949 |
| 2,986,692 | Fischer | May 30, 1961 |